US012528287B2

(12) United States Patent
Sato

(10) Patent No.: US 12,528,287 B2
(45) Date of Patent: Jan. 20, 2026

(54) LIQUID EJECTION DEVICE, CONTROL METHOD FOR CONTROLLING LIQUID EJECTION DEVICE, AND COMPUTER READABLE MEDIUM

(71) Applicant: BROTHER KOGYO KABUSHIKI KAISHA, Nagoya (JP)

(72) Inventor: Shoji Sato, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 296 days.

(21) Appl. No.: 18/324,342

(22) Filed: May 26, 2023

(65) Prior Publication Data

US 2023/0382106 A1 Nov. 30, 2023

(30) Foreign Application Priority Data

May 26, 2022 (JP) ................................ 2022-085866

(51) Int. Cl.
*B41J 29/38* (2006.01)
*B41J 2/045* (2006.01)

(52) U.S. Cl.
CPC ....... *B41J 2/04541* (2013.01); *B41J 2/04581* (2013.01)

(58) Field of Classification Search
CPC . B41J 2/04541; B41J 2/04581; B41J 2/04588
See application file for complete search history.

(56) References Cited

U.S. PATENT DOCUMENTS

2005/0190221 A1* 9/2005 Iriguchi ............... B41J 2/04588 347/12
2008/0068411 A1 3/2008 Koase

FOREIGN PATENT DOCUMENTS

JP 2006224338 A 8/2006
JP 2007320110 A 12/2007
JP 2008080814 A * 4/2008

* cited by examiner

*Primary Examiner* — Lam S Nguyen
(74) *Attorney, Agent, or Firm* — Scully, Scott, Murphy & Presser, P.C.

(57) ABSTRACT

A liquid ejection device includes a first nozzle row, a second nozzle row, a third nozzle row, and a fourth nozzle row each of which is a nozzle rows including a plurality of nozzles, a moving mechanism configured to move the plurality of nozzles and a recording medium relative to each other, a plurality of elements each of which is configured to apply ejection energy for ejecting liquid from corresponding one of the plurality of nozzles, a drive circuit configured to supply driving signals to the plurality of elements, and a controller. The controller is configured to alternately arrange a set of dots of the liquid ejected from the nozzles overlapping in the first nozzle row and the third nozzle row and a set of dots of the liquid ejected from the nozzles overlapping in the second nozzle row and the fourth nozzle row.

10 Claims, 10 Drawing Sheets

<HIGH-SPEED MODE>

LIQUID EJECTION DEVICE, CONTROL METHOD FOR CONTROLLING LIQUID EJECTION DEVICE, AND COMPUTER READABLE MEDIUM

REFERENCE TO RELATED APPLICATIONS

This application claims priority from Japanese Patent Application No. 2022-085866 filed on May 26, 2022. The entire content of the priority application is incorporated herein by reference.

BACKGROUND ART

A related art discloses a liquid ejection device including a first nozzle row and a second nozzle row shifted in a direction in which nozzles are arranged with respect to a position of the first nozzle row. When dots are formed in all pixels in a first mode (high-resolution mode), first dots formed by the nozzles of the first nozzle row and second dots formed by the nozzles of the second nozzle row are alternately formed in the direction in which the nozzles are arranged, and a dot row of the first dots and a dot row of the second dots are formed in a perpendicular direction (conveying direction of a sheet) to the direction in which the nozzles are arranged. When dots are formed in all pixels in a second mode (high-speed printing mode), a first dot row is formed such that the first dots are arranged in the direction in which the nozzles are arranged, a second dot row in which the second dots are arranged in the direction in which the nozzles are arranged is formed so as to be shifted from the first dot row in the perpendicular direction, and a distance between the first dots in the perpendicular direction is larger than a distance between the first dots in the first mode.

In the related art, the nozzles of the first nozzle row and the nozzles of the second nozzle row are shifted in the direction in which the nozzles are arranged (first direction), and do not overlap each other in the conveying direction (second direction). In addition, it is difficult to shorten an ejection cycle of a driving signal corresponding to each of the nozzles. Therefore, in a configuration of the related art, it is impossible to appropriately realize high-speed recording, high-concentration recording, high-resolution recording, and the like.

DESCRIPTION

An object of the present disclosure is to provide a liquid ejection device, a control method thereof, and a program that may realize high-speed recording, high-concentration recording, high-resolution recording, and the like.

According to a first aspect of the present disclosure, a liquid ejection device includes a first nozzle row, a second nozzle row, a third nozzle row, and a fourth nozzle row each of which is a nozzle rows including a plurality of nozzles arranged in a first direction, a moving mechanism configured to move one of the plurality of nozzles and a recording medium with respect to the other of the plurality of nozzles and a recording medium in a second direction intersecting the first direction, a plurality of elements each of which is configured to apply ejection energy for ejecting liquid from corresponding one of the plurality of nozzles, a drive circuit configured to supply driving signals to the plurality of elements, the driving signals being based on waveform signals, and a controller. The plurality of nozzles of the first nozzle row overlaps the plurality of nozzles of the third nozzle row in the second direction. The plurality of nozzles of the second nozzle row do not overlap the plurality of nozzles of the first nozzle row in the second direction, and overlap the plurality of nozzles of the fourth nozzle row in the second direction. The controller is configured to supply, to the drive circuit, the waveform signals for the nozzles overlapping in the second direction in the first nozzle row and the third nozzle row and in which start timings of ejection cycles are different from each other and the ejection cycles overlap each other, so as to alternately arrange, in the second direction on the recording medium, dots of liquid ejected from the nozzles overlapping in the second direction in the first nozzle row and the third nozzle row, supply, to the drive circuit, the waveform signals for the nozzles overlapping in the second direction in the second nozzle row and the fourth nozzle row and in which start timings of ejection cycles are different from each other and the ejection cycles overlap each other, so as to alternately arrange, in the second direction on the recording medium, dots of liquid ejected from the nozzles overlapping in the second direction in the second nozzle row and the fourth nozzle row, and alternately arrange, in a direction crossing the second direction, a set of dots of the liquid ejected from the nozzles overlapping in the second direction in the first nozzle row and the third nozzle row and a set of dots of the liquid ejected from the nozzles overlapping in the second direction in the second nozzle row and the fourth nozzle row.

According to a second aspect of the present disclosure, a control method for controlling a liquid ejection device including: a first nozzle row, a second nozzle row, a third nozzle row, and a fourth nozzle row each of which is a nozzle row including a plurality of nozzles arranged in a first direction; a moving mechanism configured to move one of the plurality of nozzles and a recording medium with respect to the other of the plurality of nozzles and the recording medium in a second direction intersecting the first direction; a plurality of elements each of which is configured to apply ejection energy for ejecting liquid from corresponding one of the plurality of nozzles; and a drive circuit configured to supply driving signals to the plurality of elements, the driving signals being based on waveform signals, the plurality of nozzles of the first nozzle row overlapping the plurality of nozzles of the third nozzle row in the second direction, and the plurality of nozzles of the second nozzle row not overlapping the plurality of nozzles of the first nozzle row in the second direction, and overlapping the plurality of nozzles of the fourth nozzle row in the second direction, includes supplying, to the drive circuit, the waveform signals for the nozzles overlapping in the second direction in the first nozzle row and the third nozzle row and in which start timings of ejection cycles are different from each other and the ejection cycles overlap each other, so as to alternately arrange, in the second direction on the recording medium, dots of liquid ejected from the nozzles overlapping in the second direction in the first nozzle row and the third nozzle row, supplying, to the drive circuit, the waveform signals for the nozzles overlapping in the second direction in the second nozzle row and the fourth nozzle row and in which start timings of ejection cycles are different from each other and the ejection cycles overlap each other, so as to alternately arranging, in the second direction on the recording medium, dots of liquid ejected from the nozzles overlapping in the second direction in the second nozzle row and the fourth nozzle row, and alternately arranging, in a direction crossing the second direction, a set of dots of the liquid ejected from the nozzles overlapping in the second direction in the first nozzle row and the third nozzle row and a set of dots of the liquid ejected from the nozzles overlapping in the second direction in the second nozzle row and the fourth nozzle row.

According to a third aspect of the present disclosure, a non-transitory computer readable medium stores a program causing the liquid ejection device to execute a process including supplying, to the drive circuit, the waveform signals for the nozzles overlapping in the second direction in the first nozzle row and the third nozzle row and in which start timings of ejection cycles are different from each other and the ejection cycles overlap each other, so as to alternately arrange, in the second direction on the recording medium, dots of liquid ejected from the nozzles overlapping in the second direction in the first nozzle row and the third nozzle row, supplying, to the drive circuit, the waveform signals for the nozzles overlapping in the second direction in the second nozzle row and the fourth nozzle row and in which start timings of ejection cycles are different from each other and the ejection cycles overlap each other, so as to alternately arranging, in the second direction on the recording medium, dots of liquid ejected from the nozzles overlapping in the second direction in the second nozzle row and the fourth nozzle row, and alternately arranging, in a direction crossing the second direction, a set of dots of the liquid ejected from the nozzles overlapping in the second direction in the first nozzle row and the third nozzle row and a set of dots of the liquid ejected from the nozzles overlapping in the second direction in the second nozzle row and the fourth nozzle row.

According to the present disclosure, it is possible to appropriately realize high-speed recording, high-concentration recording, high-resolution recording, and the like.

FIGS. 5A, 5B, 5C, and 5D are waveform diagrams illustrating four pieces of waveform data included in a waveform signal FIRE.

Figure 1:
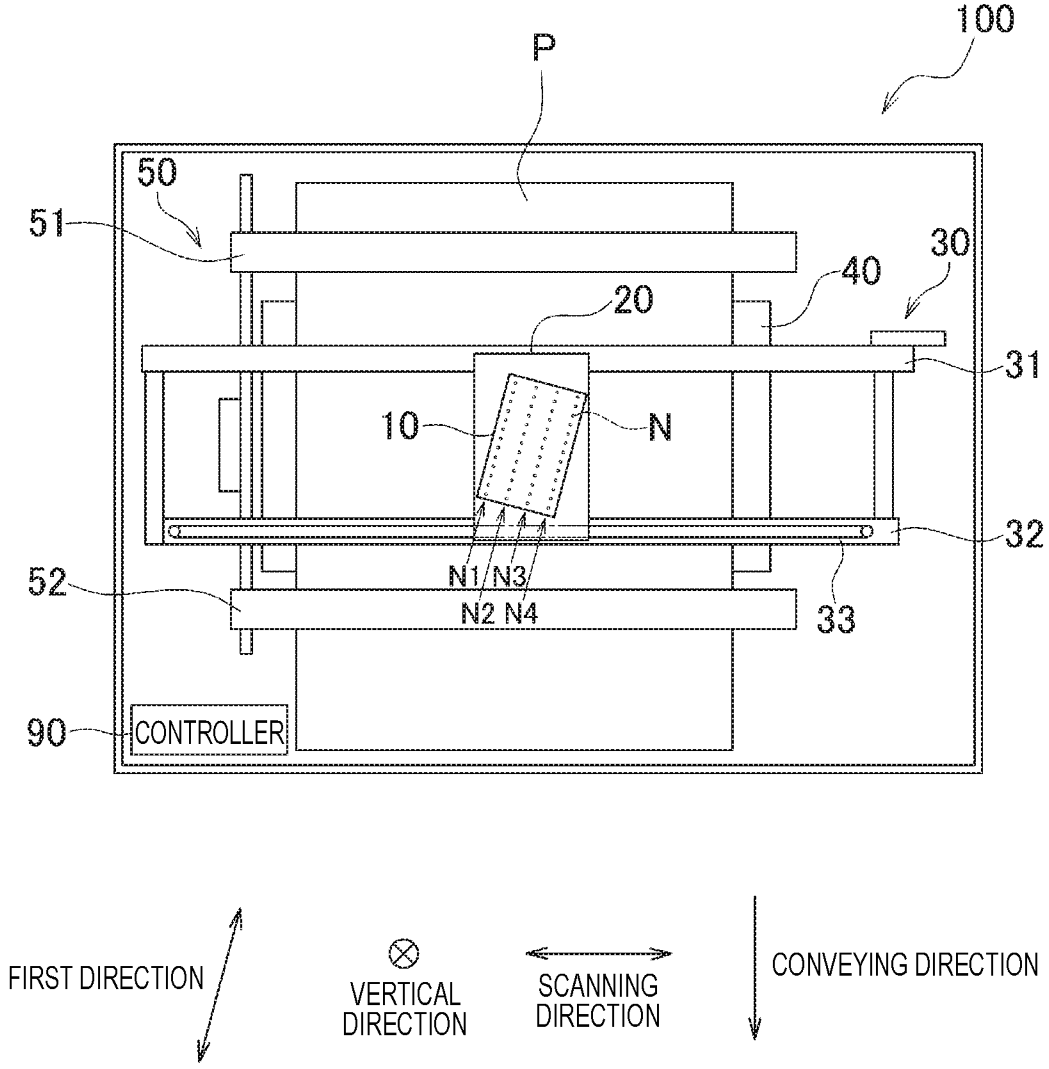
FIG. 1 is a plan view illustrating an overall configuration of a printer.
Figure 6:
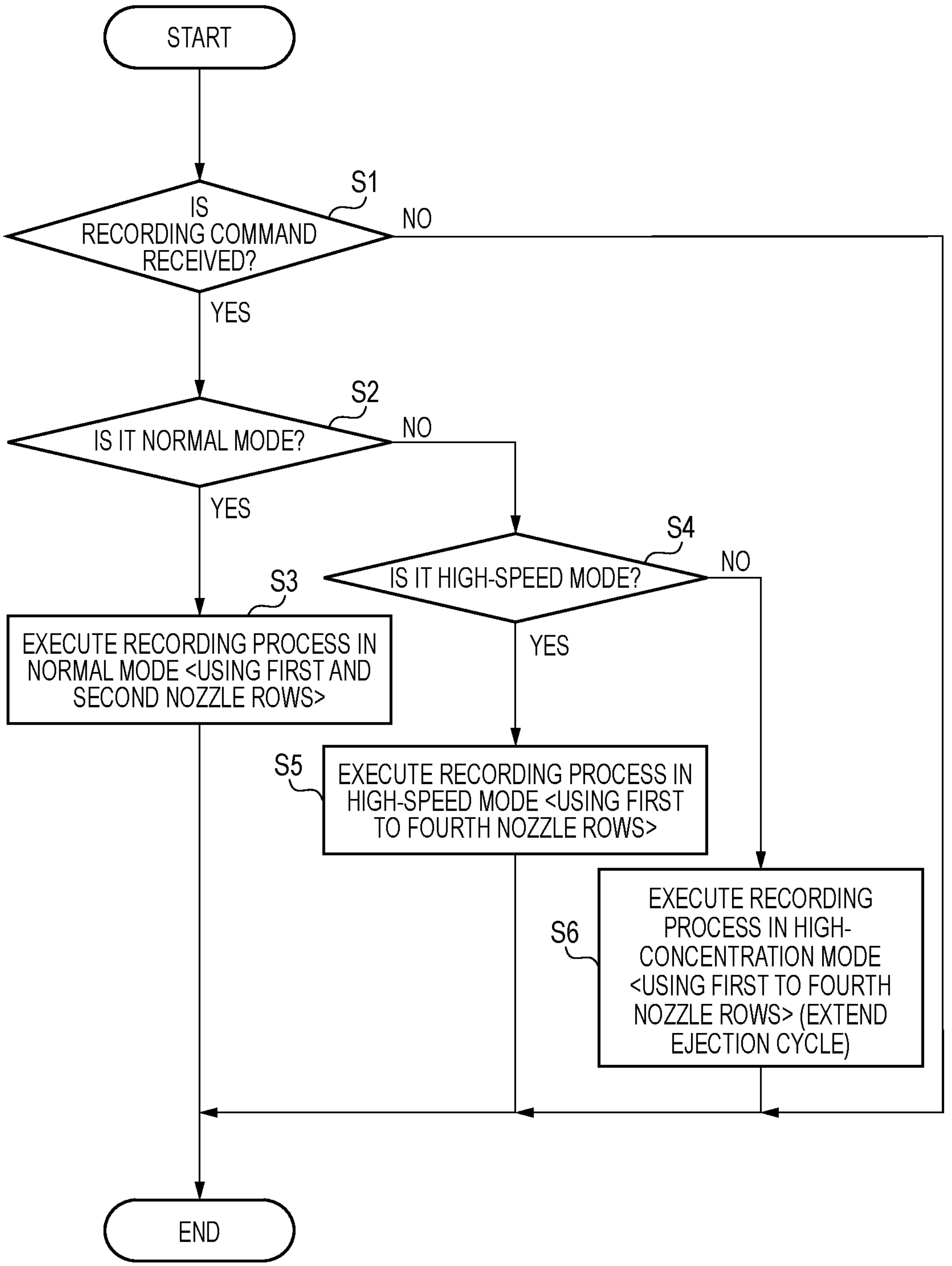

FIG. 6 is a flowchart illustrating a program executed by a controller of the printer illustrated in FIG. 1.

Figure 7:
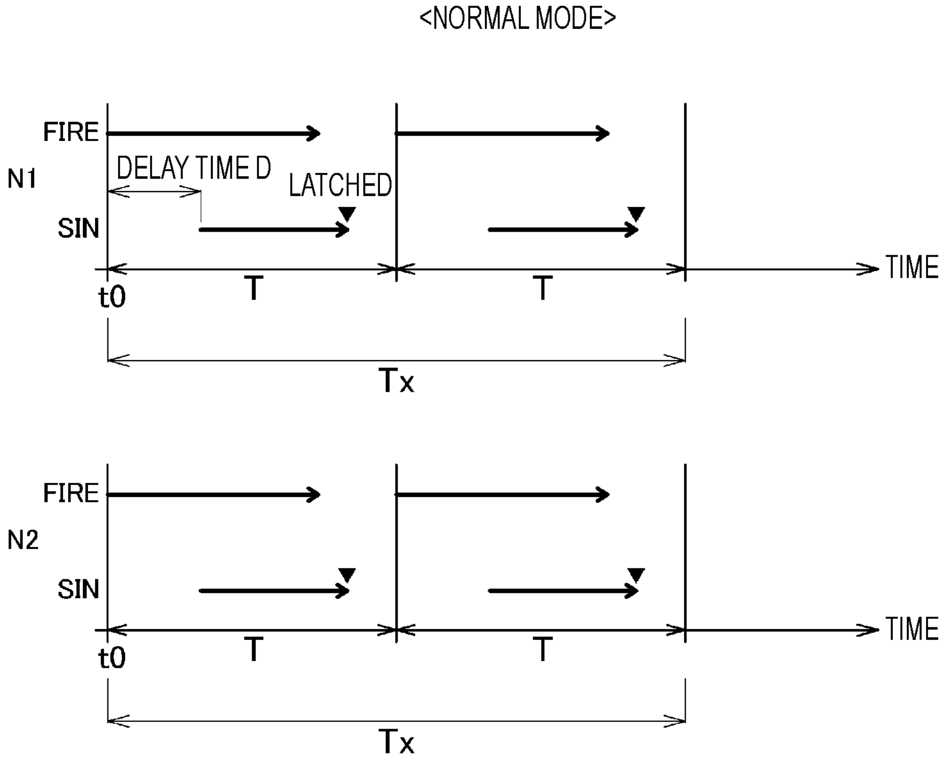

FIG. 7 is an explanatory view illustrating a process in which the waveform signal FIRE and a selection signal SIN are supplied from the controller to a driver IC in a normal mode.

Figure 8:
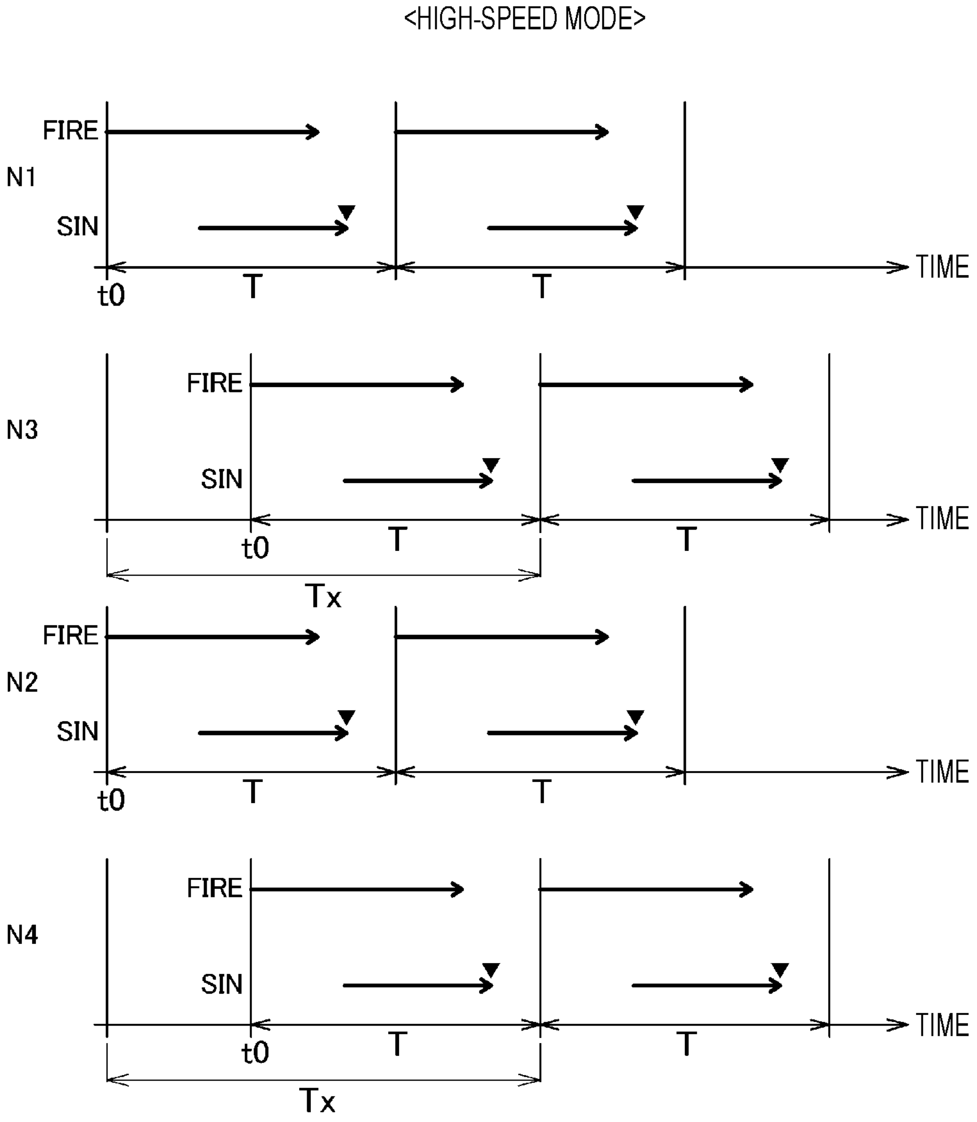

FIG. 8 is an explanatory view illustrating a process in which the waveform signals FIRE and the selection signal SIN are supplied from the controller to the driver IC in a high-speed mode.

Figure 9:
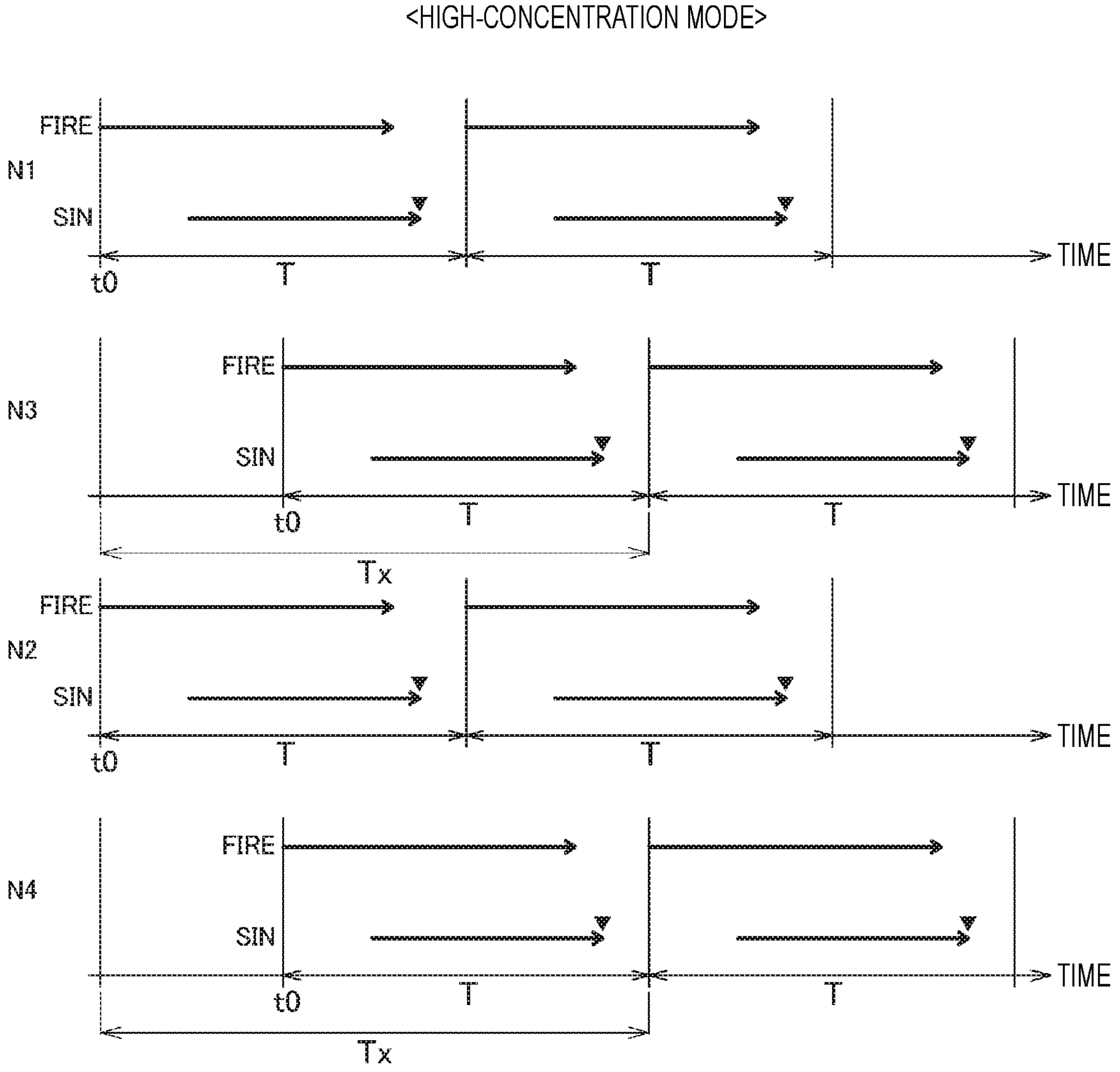

FIG. 9 is an explanatory view illustrating a process in which the waveform signals FIRE and the selection signal SIN are supplied from the controller to the driver IC in a high-concentration mode.

Figure 10:
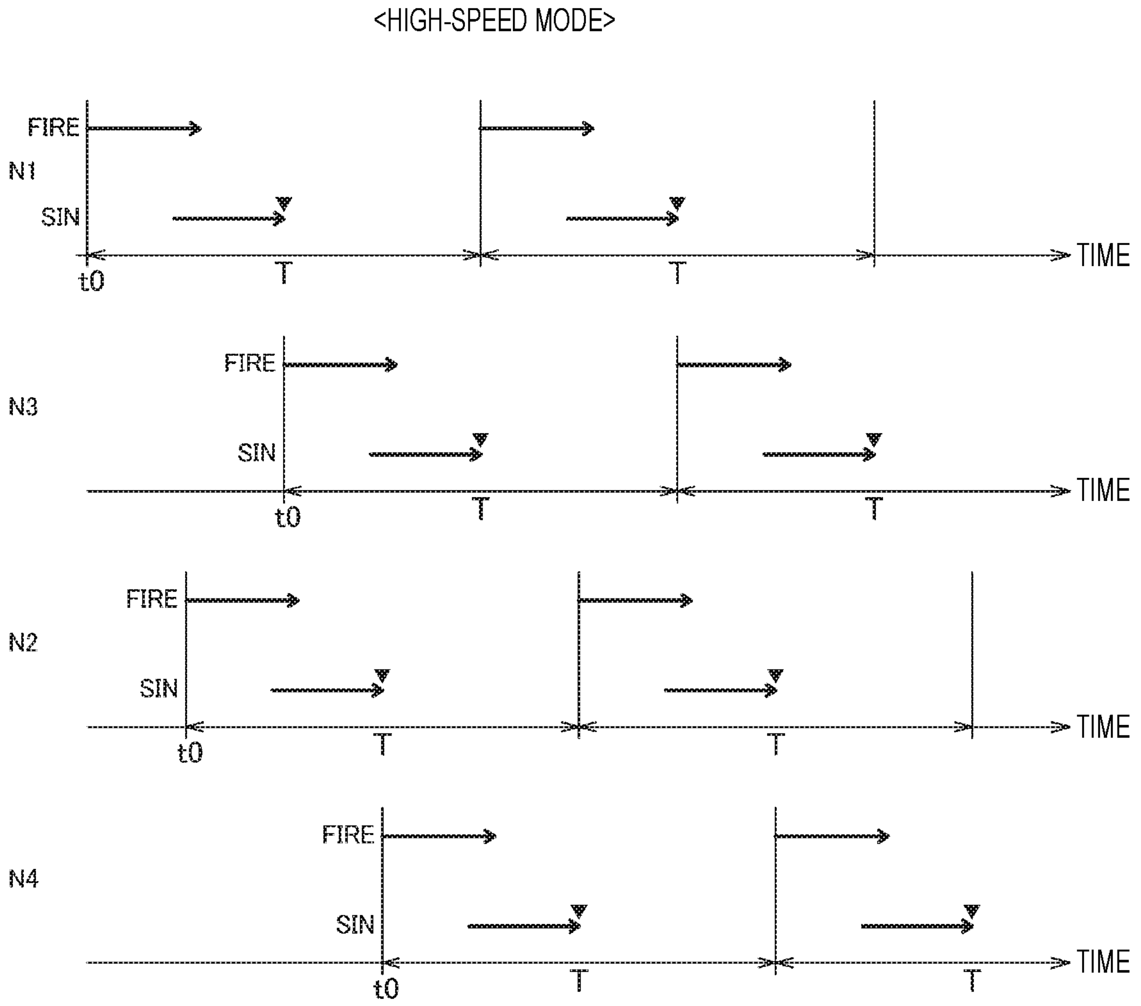

FIG. 10 is an explanatory view illustrating a process in which the waveform signals FIRE and the selection signal SIN are supplied from the controller to the driver IC in a high-speed mode in a printer.

FIRST EMBODIMENT

As illustrated in FIG. 1, a printer (liquid ejection device) 100 according to a first embodiment of the present invention includes a head 10 having a plurality of nozzles N formed on a lower surface thereof, a carriage 20 that holds the head 10, a scanning mechanism 30 that moves the carriage 20 in a scanning direction (direction perpendicular to the vertical direction), a platen 40 that supports a sheet (recording medium) P from below, a conveying mechanism 50 that conveys the sheet P in a conveying direction (direction perpendicular to the scanning direction and the vertical direction), and a controller 90.

The nozzles N are arranged obliquely with respect to the scanning direction and the conveying direction. Specifically, the nozzles N are arranged in a first direction intersecting both the scanning direction (second direction) and the conveying direction (orthogonal direction), and constitute four nozzle rows (first nozzle row N1, second nozzle row N2, third nozzle row N3, and fourth nozzle row N4). Each of the nozzle rows N1 to N4 includes a plurality of nozzles N arranged in the first direction.

Figure 2:
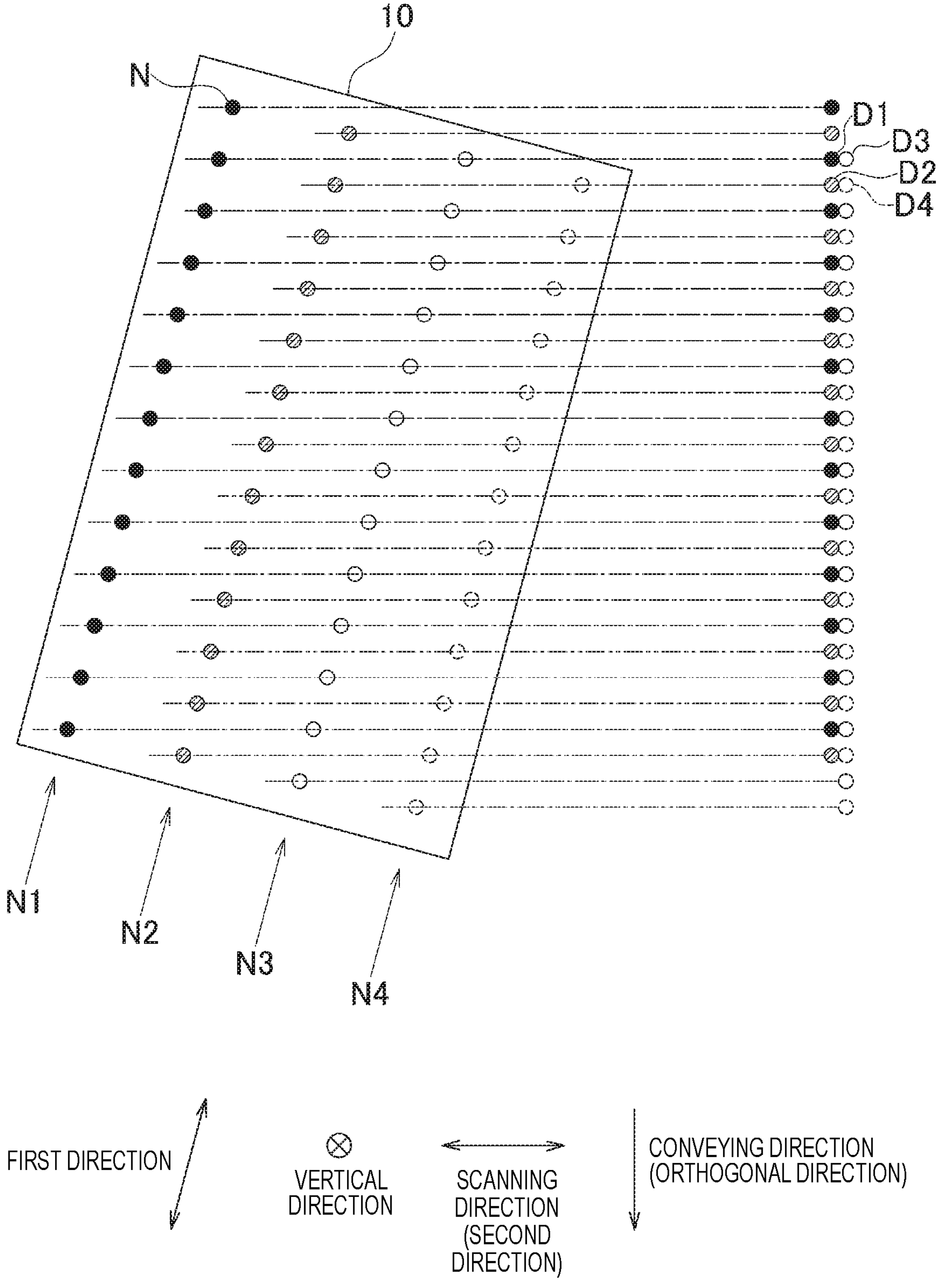
FIG. 2 is an explanatory view illustrating an arrangement of nozzles of a head in FIG. 1 and an arrangement of dots of ink ejected from each of the nozzles.

More specifically, as illustrated in FIG. 2, the nozzles N of the first nozzle row N1 and the nozzles N of the third nozzle row N3 overlap in the scanning direction except for a nozzle N arranged at one end (upper end in FIG. 2) in the first direction in the first nozzle row N1 and a nozzle N arranged at the other end (lower end in FIG. 2) in the first direction in the third nozzle row N3. The nozzles N of the second nozzle row N2 and the nozzles N of the fourth nozzle row N4 overlap in the scanning direction except for a nozzle N arranged at one end (upper end in FIG. 2) in the first direction in the second nozzle row N2 and a nozzle N arranged at the other end (lower end in FIG. 2) in the first direction in the fourth nozzle row N4. The nozzles N of the second nozzle row N2 do not overlap with any of the nozzles N of the first nozzle row N1 and the nozzles N of the third nozzle row N3 in the scanning direction. The nozzles N of the fourth nozzle row N4 do not overlap with any of the nozzles N of the first nozzle row N1 and the nozzles N of the third nozzle row N3 in the scanning direction.

The nozzles N of each of the nozzle rows N1 to N4 eject ink of the same color (for example, black).

In FIG. 2, for the sake of illustration, the nozzles N constituting each of the nozzle rows N1 to N4 and dots D1 to D4 of the ink ejected from the nozzles N of each of the nozzle rows N1 to N4 are indicated by solid black, oblique lines, solid lines, and broken lines for each row.

As illustrated in FIG. 1, the scanning mechanism 30 includes a pair of guides 31 and 32 supporting the carriage 20, and a belt 33 connected to the carriage 20. The guides 31 and 32 and the belt 33 extend in the scanning direction. When a carriage motor 30*m* (see FIG. 4) is driven under control of the controller 90, the belt 33 travels, and the carriage 20 moves in the scanning direction along the guides 31 and 32. The scanning mechanism 30 relatively moves the nozzles N and the sheet P in the scanning direction (second direction), and corresponds to a "moving mechanism" of the present invention.

The platen 40 is disposed below the carriage 20 and the head 10. The sheet P is supported on an upper surface of the platen 40.

The conveying mechanism 50 includes two roller pairs 51 and 52. The head 10, the carriage 20, and the platen 40 are disposed between the roller pair 51 and the roller pair 52 in the conveying direction. When a conveying motor 50*m* (see FIG. 4) is driven under the control of the controller 90, the roller pairs 51 and 52 rotate in a state of nipping the sheet P, and the sheet P is conveyed in the conveying direction.

Figure 3:
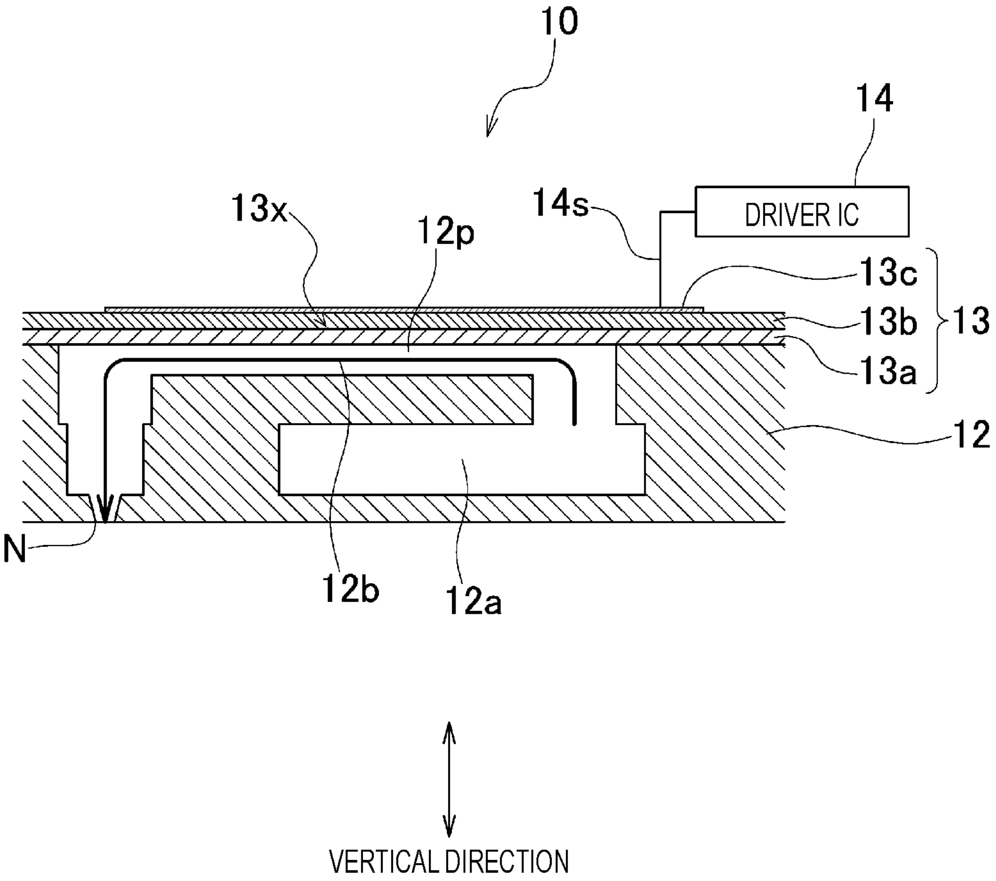
FIG. 3 is a cross-sectional view of the head illustrated in FIG. 1.

As illustrated in FIG. 3, the head 10 includes a flow path unit 12 and an actuator unit 13.

A plurality of nozzles N are opened in a lower surface of the flow path unit 12. A plurality of pressure chambers 12*p* are opened in an upper surface of the flow path unit 12. A common flow path 12*a* communicating with an ink tank (not illustrated) and an individual flow path 12*b* for each of the nozzles N are formed inside the flow path unit 12. The individual flow path 12*b* is a flow path from an outlet of the common flow path 12*a* to the nozzles N via a pressure chamber 12*p*.

The actuator unit 13 includes a metal vibration plate 13*a* disposed on the upper surface of the flow path unit 12 so as to cover the plurality of pressure chambers 12*p*, a piezoelectric layer 13*b* disposed on an upper surface of the vibration plate 13*a*, and a plurality of individual electrodes 13*c* disposed on an upper surface of the piezoelectric layer 13*b* so as to face the plurality of pressure chambers 12*p*, respectively.

The vibration plate 13*a* and the plurality of individual electrodes 13*c* are electrically connected to the driver IC 14. The driver IC 14 corresponds to a "drive circuit" of the present invention, and changes a potential of the individual electrode 13*c* while maintaining a potential of the vibration plate 13*a* at ground potential. Specifically, the driver IC 14 generates a driving signal based on a control signal (waveform signal FIRE and selection signal SIN to be described later) from the controller 90, and supplies the driving signal to the individual electrode 13*c* via a signal line 14*s* for each ejection cycle (cycle in which ink is ejected from the nozzle N). As a result, the potential of the individual electrode 13*c* changes between a predetermined driving potential (VDD) and the ground potential (0 V) (see FIGS. 5A, 5B, 5C, and 5D). In this case, in the vibration plate 13*a* and the piezoelectric layer 13*b*, due to deformation of a portion (actuator 13*x*) sandwiched between each individual electrode 13*c* and each pressure chamber 12*p*, a volume of the pressure chamber 12*p* changes, pressure (ejection energy) is applied to the ink in the pressure chamber 12*p*, and the ink is ejected from the nozzle N. The actuator 13*x* corresponds to an "element" of the present invention, is provided for each individual electrode 13*c* (that is, for each nozzle N), and may be deformed independently according to the potential supplied to the individual electrode 13*c*.

Figure 4:
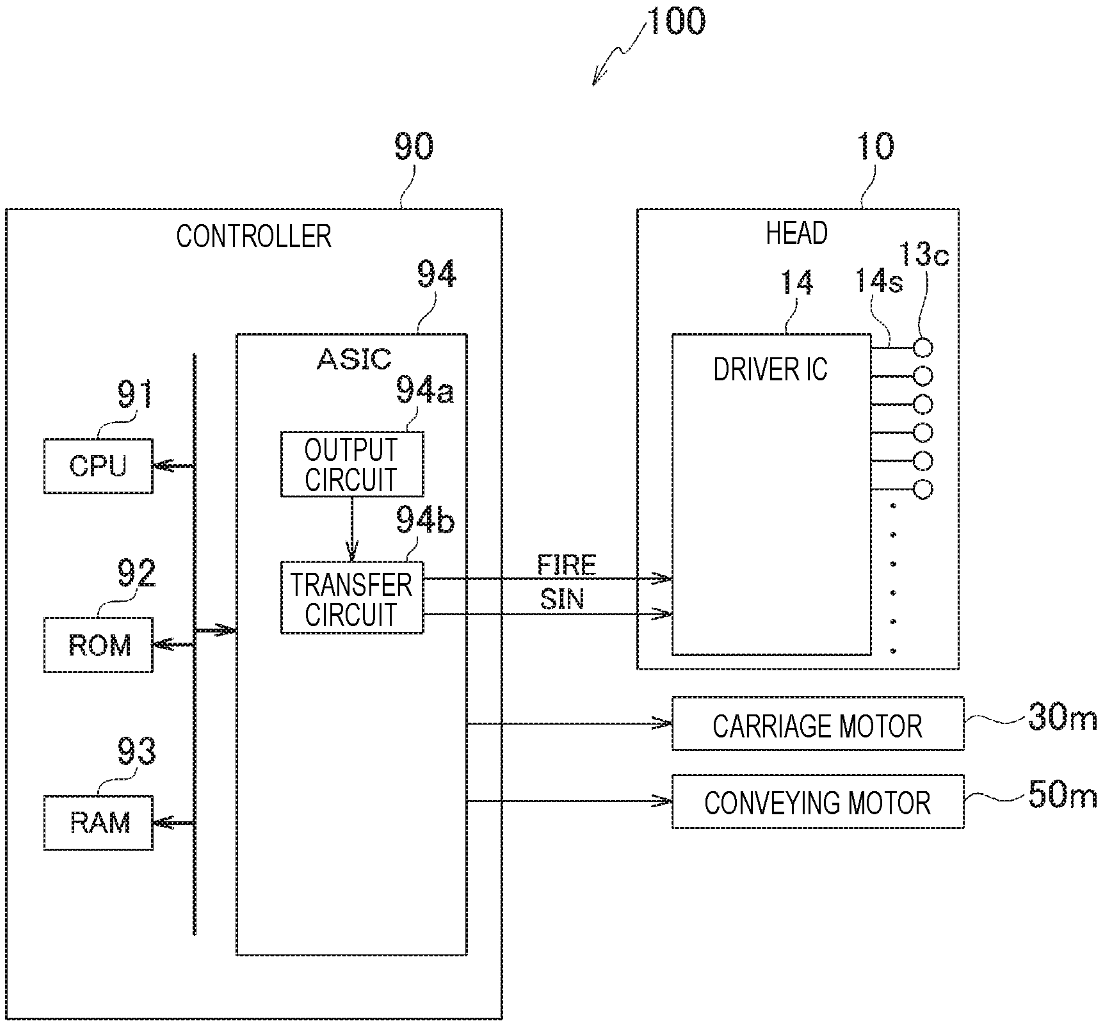
FIG. 4 is a block diagram illustrating an electrical configuration of the printer in FIG. 1.
Figure 5A:
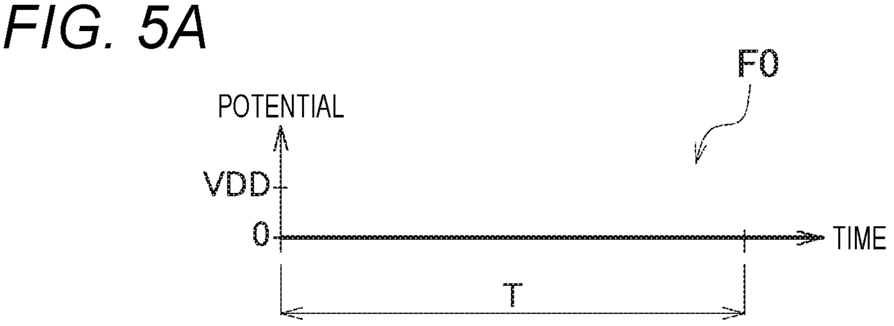
Figure 5B:
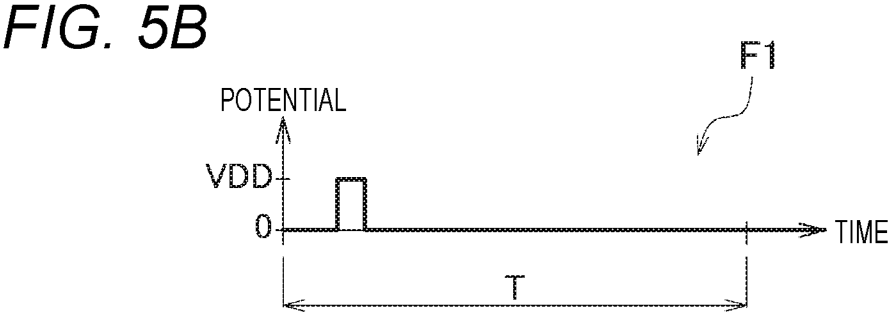
Figure 5C:
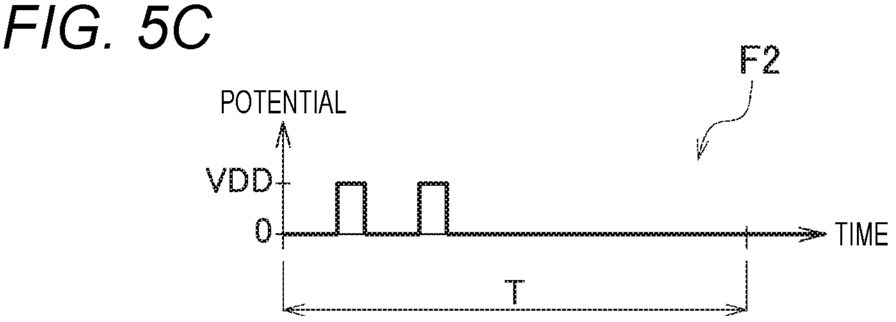
Figure 5D:
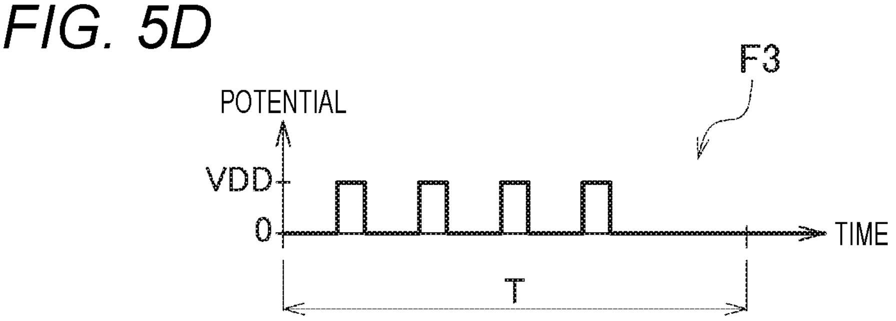

As illustrated in FIG. 4, the controller 90 includes a central processing unit (CPU) 91, a read only memory (ROM) 92, a random access memory (RAM) 93, and an application specific integrated circuit (ASIC) 94. The ROM 92 stores programs and data for the CPU 91 and the ASIC 94 to perform various control. The RAM 93 temporarily stores data used when the CPU 91 or the ASIC 94 executes a program. The controller 90 is communicably connected to an external device (such as a personal computer), and executes a recording process by the CPU 91 or the ASIC 94 based on a recording command received from the external device.

In the recording process, the ASIC 94 drives the driver IC 14, the carriage motor and the conveying motor 50*m* in accordance with a command from the CPU 91, and alternately causes the conveying mechanism 50 to perform a conveying operation of conveying the sheet P in the conveying direction by a predetermined amount and causes the scanning mechanism 30 to perform a scanning operation of ejecting ink from the nozzles N while moving the carriage 20 in the scanning direction. Thus, dots of the ink are formed on the sheet P, and an image is recorded.

The ASIC 94 includes an output circuit 94*a* and a transfer circuit 94*b*.

The output circuit 94*a* generates the waveform signal FIRE and the selection signal SIN, and outputs these signals to the transfer circuit 94*b* in each ejection cycle. One ejection cycle is a time required for the sheet P to move relative to the head 10 by a unit distance corresponding to the resolution of the image formed on the sheet P, and corresponds to one pixel.

The waveform signal FIRE is a serial signal obtained by serializing four pieces of waveform data F0 to F3 (see FIGS. 5A, 5B, 5C, and 5D). In the waveform data F0 (see FIG. 5A), an amount of ink ejected from the nozzles N in one ejection cycle T corresponds to "zero (no ejection)", and the potential of the individual electrode 13*c* is maintained at the ground potential (0 V). In the waveform data F1 (see FIG. 5B), the amount of ink ejected from the nozzles N in one ejection cycle T corresponds to "small", one pulse that changes the potential of the individual electrode 13*c* between the ground potential (0 V) and the driving potential (VDD) is included, and one droplet of ink is caused to be ejected from the nozzles N. In the waveform data F2 (see FIG. 5C), the amount of ink ejected from the nozzles N in one ejection cycle T corresponds to "medium", two pulses that change the potential of the individual electrode 13*c* between the ground potential (0 V) and the driving potential (VDD) are included, and two droplets of ink are caused to be ejected from the nozzles N. In the waveform data F3 (see FIG. 5D), the amount of ink ejected from the nozzles N in one ejection cycle T corresponds to "large", four pulses that change the potential of the individual electrode 13*c* between the ground potential (0 V) and the driving potential (VDD) are included, and four droplets of ink are caused to be ejected from the nozzles N.

The waveform signal FIRE includes the four pieces of waveform data F0 to F3 (see FIGS. 5A, 5B, 5C, and 5D), thereby indicating four driving modes of the actuator 13*x* as a whole. The driving mode of the actuator 13*x* refers to a mode of deformation of the actuator 13*x* as described above corresponding to a change in potential of the individual electrode 13*c*. The driving mode of the actuator 13*x* differs according to the change in potential of the individual electrode 13*c* (that is, for each piece of the waveform data F0 to F3). Depending on the driving mode of the actuator 13*x*, a change in volume of the pressure chamber 12*p*, a state of a meniscus formed in the nozzles N, the amount of ink ejected from the nozzles N (including zero), and the like are different.

The waveform signal FIRE indicates the driving mode of the actuator 13*x*, and does not include waveform data for preventing satellite droplets (for example, waveform data having a plurality of pulses arranged over two consecutive ejection cycles T).

The selection signal SIN is a serial signal including selection data for selecting one of the four pieces of waveform data F0 to F3 (see FIGS. 5A, 5B, 5C, and 5D), and is generated for each actuator 13*x* and for each ejection cycle T based on image data included in the recording command.

The transfer circuit 94*b* transfers (supplies) the waveform signal FIRE and the selection signal SIN received from the output circuit 94*a* to the driver IC 14. The transfer circuit 94*b* incorporates a low voltage differential signaling (LVDS) driver corresponding to each of the above-mentioned signals, and transfers each signal as a pulsed differential signal to the driver IC 14. An LVDS system is a system in which signals (H signal and L signal) having opposite phases are input to two signal lines, respectively, and has a feature of being resistant to noise and capable of transmitting a signal at a low voltage by reducing an amplitude of the signal as compared with a single end system in which a signal is input by only one signal line. Since the LVDS system may reduce the amplitude of the signal, a time required for switching between the H signal and the L signal may be shortened, and as a result, a frequency of the signal may be increased to transmit data at a high speed. In particular, since the selection signal SIN includes pieces of selection data of the number of actuators 13$x$ (the number of nozzles N), an amount of data may be enormous. By transferring the signal by the LVDS system, high-speed transmission is possible.

Next, a program executed by the controller 90 will be described with reference to FIG. 6. This process is repeatedly started, for example, while power is being supplied to the printer 100.

First, the controller 90 determines whether a recording command is received from the external device (S1). When the recording command is not received (NO in S1), the controller 90 ends the program.

When the recording command is received (YES in S1), the controller 90 determines whether a recording mode indicated by the recording command is a normal mode (S2).

The recording mode includes the normal mode, a high-speed mode, and a high-concentration mode. The high-speed mode and the high-concentration mode correspond to a "first ejection mode" of the present invention, and the normal mode corresponds to a "second ejection mode" of the present invention.

When it is determined that the recording mode is the normal mode (YES in S2), the controller 90 executes the recording process in the normal mode (S3) and ends the program.

When it is determined that the recording mode is not the normal mode (NO in S2), the controller 90 determines whether the recording mode is the high-speed mode (S4).

When it is determined that the recording mode is the high-speed mode (YES in S4), the controller 90 executes the recording process in the high-speed mode (S5) and ends the program.

When it is determined that the recording mode is not the high-speed mode (NO in S4), the controller 90 executes the recording process in the high-concentration mode (S6) and ends the program.

In the normal mode, one of the first nozzle row N1 and the third nozzle row N3 that includes nozzles N having no ejection failure is selected, and one of the second nozzle row N2 and the fourth nozzle row N4 that includes nozzles N having no ejection failure is selected. For example, before execution of the program, detection of an ejection failure is executed for all the nozzles N, and the nozzle row is selected based on a detection result. In FIGS. 6 and 7, an example is illustrated in which the first nozzle row N1 and the second nozzle row N2 are selected based on a result that an ejection failure is detected in the nozzles N of the third nozzle row N3 and the fourth nozzle row N4 and an ejection failure in the nozzles N is not detected in the first nozzle row N1 and the second nozzle row N2. In this case, the controller 90 transfers the waveform signal FIRE and the selection signal SIN for the first nozzle row N1 and the second nozzle row N2 from the transfer circuit 94$b$ to the driver IC 14.

In FIG. 7, a time point t0 represents a time point at which the transfer circuit 94$b$ receives the waveform signal FIRE and the selection signal SIN from the output circuit 94$a$, and corresponds to a start timing of the ejection cycle T. The transfer of the waveform signal FIRE is started at the time point to. The transfer of the selection signal SIN is started after a delay time D has elapsed from the time point t0, and ends after a transfer completion time point of the waveform signal FIRE. At the transfer completion time point of the selection signal SIN, the selection signal SIN is latched (that is, temporarily held or stored). After the transfer of the waveform signal FIRE and the selection signal SIN for one ejection cycle T is completed, a transfer of the waveform signal FIRE and the selection signal SIN for a next ejection cycle T is started.

In the normal mode, by using one of the first nozzle row N1 and the third nozzle row N3 (in this example, the first nozzle row N1) and one of the second nozzle row N2 and the fourth nozzle row N4 (in this example, the second nozzle row N2), dots of the ink ejected from the nozzles N of the nozzle row are landed on the sheet P. Specifically, although the dots D1 to D4 of all the nozzle rows N1 to N2 are illustrated in FIG. 2, the dots D1 of the first nozzle row N1 and the dots D2 of the second nozzle row N2 land on the sheet P in this example.

In the high-speed mode, all the nozzle rows N1 to N4 are used. In this case, as illustrated in FIG. 8, the controller 90 transfers the waveform signal FIRE and the selection signal SIN for the first nozzle row N1 to the fourth nozzle row N4 from the transfer circuit 94$b$ to the driver IC 14.

In FIG. 8, the signals (waveform signal FIRE and selection signal SIN) of the first nozzle row N1 and the third nozzle row N3 are signals for the nozzles N overlapping in the scanning direction in the two rows. The signals of the first nozzle row N1 and the third nozzle row N3 are configured such that the ejection cycles T are shifted from each other, start timings t0 of the ejection cycles T are different from each other, and the ejection cycles T overlap each other. When the signals are supplied to the driver IC 14, the dots D1 and D3 of the ink ejected from the nozzles N overlapping in the scanning direction in the first nozzle row N1 and the third nozzle row N3 are alternately arranged in the scanning direction on the sheet P (see FIG. 2).

In FIG. 8, signals (waveform signal FIRE and selection signal SIN) of the second nozzle row N2 and the fourth nozzle row N4 are signals for the nozzles N overlapping in the scanning direction in the two rows. These signals of the second nozzle row N2 and the fourth nozzle row N4 are configured such that the ejection cycles T are shifted from each other, start timings t0 of the ejection cycles T are different from each other, and the ejection cycles T overlap each other. When the signals are supplied to the driver IC 14, the dots D2 and D4 of the ink ejected from the nozzles N overlapping in the scanning direction in the second nozzle row N2 and the fourth nozzle row N4 are alternately arranged in the scanning direction on the sheet P (see FIG. 2).

Further, a set of the dots D1 and D3 and a set of the dots D2 and D4 are alternately arranged in the conveying direction (see FIG. 2).

In FIG. 8, the signals of the first nozzle row N1 and the second nozzle row N2 have the same ejection cycle T and the same start timing t0 of the ejection cycle T.

The ejection cycle T of the signals supplied to the driver IC 14 in the high-speed mode (see FIG. 8) is the same length as the ejection cycle T of the signals supplied to the driver IC 14 in the normal mode (see FIG. 7). An ejection cycle Tx corresponding to the two dots D1 and D3, or D2 and D4 arranged in the scanning direction is shorter in the high-speed mode (see FIG. 8) than in the normal mode (see FIG. 7).

In the high-concentration mode, as in the high-speed mode, all the nozzle rows N1 to N4 are used. In this case, as illustrated in FIG. 9, the controller 90 transfers the waveform signal FIRE and the selection signal SIN for the first nozzle row N1 to the fourth nozzle row N4 from the transfer circuit 94*b* to the driver IC 14.

In FIG. 9, signals (waveform signal FIRE and selection signal SIN) of the first nozzle row N1 and the third nozzle row N3 are signals for the nozzles N overlapping in the scanning direction in the two rows. The signals of the first nozzle row N1 and the third nozzle row N3 are configured such that the ejection cycles T are shifted from each other, start timings t0 of the ejection cycles T are different from each other, and the ejection cycles T overlap each other. When the signals are supplied to the driver IC 14, the dots D1 and D3 of the ink ejected from the nozzles N overlapping in the scanning direction in the first nozzle row N1 and the third nozzle row N3 are alternately arranged in the scanning direction on the sheet P (see FIG. 2).

In FIG. 9, signals (waveform signal FIRE and selection signal SIN) of the second nozzle row N2 and the fourth nozzle row N4 are signals for the nozzles N overlapping in the scanning direction in the two rows. These signals of the second nozzle row N2 and the fourth nozzle row N4 are configured such that the ejection cycles T are shifted from each other, start timings t0 of the ejection cycles T are different from each other, and the ejection cycles T overlap each other. When the signals are supplied to the driver IC 14, the dots D2 and D4 of the ink ejected from the nozzles N overlapping in the scanning direction in the second nozzle row N2 and the fourth nozzle row N4 are alternately arranged in the scanning direction on the sheet P (see FIG. 2).

Further, a set of the dots D1 and D3 of the ink ejected from the nozzles N overlapping in the scanning direction in the first nozzle row N1 and the third nozzle row N3 and a set of the dots D2 and D4 of the ink ejected from the nozzles N overlapping in the scanning direction in the second nozzle row N2 and the fourth nozzle row N4 are alternately arranged in the orthogonal direction orthogonal to the second direction (see FIG. 2).

In FIG. 9, the signals of the first nozzle row N1 and the second nozzle row N2 have the same ejection cycle T and the same start timing t0 of the ejection cycle T.

The ejection cycle T of the signals supplied to the driver IC 14 in the high-concentration mode (see FIG. 9) is longer than the ejection cycle T of the signals supplied to the driver IC 14 in the normal mode (see FIG. 7) and longer than the ejection cycle T of the signals supplied to the driver IC 14 in the high-speed mode (see FIG. 8). The ejection cycle Tx corresponding to the two dots D1 and D3, or D2 and D4 arranged in the scanning direction is the same as that in the high-concentration mode (see FIG. 9) and the normal mode (see FIG. 7), and is longer in the high-concentration mode (see FIG. 9) than in the high-speed mode (see FIG. 8).

In the high-speed mode (see FIG. 8) and the high-concentration mode (see FIG. 9), there may be waveform signals of which the ejection cycles T do not overlap each other between the first nozzle row N1 and the third nozzle row N3 and between the second nozzle row N2 and the fourth nozzle row N4, for example, at the start or end of a recording operation.

As described above, according to the present embodiment, the nozzles N of the first nozzle row N1 and the nozzles N of the third nozzle row N3 overlap in the scanning direction, and the nozzles N of the second nozzle row N2 and the nozzles N of the fourth nozzle row N4 overlap in the scanning direction (see FIG. 2). In order to realize high-speed recording, when the ink is ejected from the nozzles N overlapping in the scanning direction, as in the high-speed mode illustrated in FIG. 8, the ejection cycle T is made the same as that in the normal mode (FIG. 7), and the start timing t0 of the ejection cycle T is shifted. As a result, the ejection cycle Tx corresponding to the two dots D1 and D3, or D2 and D4 arranged in the scanning direction may be made shorter than that in the normal mode, and high-speed recording may be realized. In order to realize high-concentration recording, when the ink is ejected from the nozzles N overlapping in the scanning direction, as in the high-concentration mode illustrated in FIG. 9, the ejection cycle T is made longer than that in the normal mode (FIG. 7), and the start timing t0 of the ejection cycle T is shifted. As a result, ink droplets larger than those in the normal mode may be ejected, and high-concentration recording may be realized. In addition, by alternately arranging the set of the dots D1 and D3 and the set of the dots D2 and D4 in the conveying direction (see FIG. 2), the recording resolution in the conveying direction may be increased. As described above, according to the present embodiment, a high-speed recording, a high-concentration recording, a high-resolution recording, and the like may be appropriately realized.

The controller 90 may switch between the normal mode, the high-speed mode, and the high-concentration mode (see FIG. 6). In the high-speed mode and the high-concentration mode, all the nozzle rows N1 to N4 are used, the waveform signals FIRE of which the start timings t0 of the ejection cycles T are different from each other between the first nozzle row N1 and the third nozzle row N3 and between the second nozzle row N2 and the fourth nozzle row N4 and the ejection cycles T overlap each other are supplied (see FIGS. 8 and 9), the dots D1 and D3 are alternately arranged on the sheet P in the scanning direction, the dots D2 and D4 are alternately arranged on the sheet P in the scanning direction, and the set of the dots D1 and D3 and the set of the dots D2 and D4 are alternately arranged in the conveying direction (see FIG. 2). On the other hand, in the normal mode, one of the first nozzle row N1 and the third nozzle row N3 and one of the second nozzle row N2 and the fourth nozzle row N4 are used, the waveform signal FIRE for the nozzle row is supplied (see FIG. 7), and dots of the ink ejected from the nozzles N of the nozzle row land on the sheet P. By switching the ejection mode in this manner, for example, high-speed recording and a countermeasure to a non-ejecting nozzle may be appropriately realized.

In the normal mode, the controller 90 supplies, to the driver IC 14, the waveform signal FIRE for the nozzles N having no ejection failure among the first nozzle row N1 and the third nozzle row N3 and the nozzles N having no ejection failure among the second nozzle row N2 and the fourth nozzle row N4. In this case, deterioration of the image quality may be prevented by ejecting the ink from the nozzles N having no ejection failure.

In the high-speed mode illustrated in FIG. 8, the ejection cycle T is made the same as that in the normal mode (FIG. 7), and the start timing t0 of the ejection cycle T is shifted. As a result, the ejection cycle Tx corresponding to the two dots D1 and D3, or D2 and D4 arranged in the scanning direction may be made shorter than that in the normal mode, and high-speed recording may be realized.

In the high-concentration mode (see FIG. 9), the ejection cycle T is made longer than that in the normal mode (FIG. 7), and the start timing t0 of the ejection cycle T is shifted. As a result, ink droplets larger than those in the normal mode may be ejected, and high-concentration recording may be realized.

The ejection cycle T in the high-concentration mode (see FIG. 9) is longer than the ejection cycle T in the high-speed mode (see FIG. 8). As a result, ink droplets larger than those in the high-speed mode may be ejected, and high-concentration recording may be realized.

SECOND EMBODIMENT

Next, a second embodiment of the present invention will be described.

According to the first embodiment, in the high-speed mode (see FIG. 8), the start timing t0 of the ejection cycle T is the same between the first nozzle row N1 and the second nozzle row N2, and the start timing t0 of the ejection cycle T is the same between the third nozzle row N3 and the fourth nozzle row N4. In contrast, according to the second embodiment, in the high-speed mode (see FIG. 10), the start timings t0 of the ejection cycles T are different in all the nozzle rows N1 to N4.

In the high-speed mode (see FIG. 10), the controller 90 generates the start timing t0 of the second nozzle row N2 after the start timing t0 of the first nozzle row N1, generates the start timing t0 of the third nozzle row N3 after the start timing t0 of the second nozzle row N2, and generates the start timing t0 of the fourth nozzle row N4 after the start timing t0 of the third nozzle row N3.

The waveform signals FIRE for the first nozzle row N1, the second nozzle row N2, the third nozzle row N3, and the fourth nozzle row N4 do not temporally overlap each other. The waveform signal FIRE of the present embodiment includes, for example, two pieces of waveform data F0 and F1 (see FIGS. 5A, 5B, 5C, and 5D), and is shorter than the waveform signal FIRE in the first embodiment (see FIG. 8). The ejection cycle T in the high-speed mode in the second embodiment (see FIG. 10) is longer than the ejection cycle T in the high-speed mode in the first embodiment (see FIG. 8).

As described above, according to the present embodiment, peaks of the power generated at the start timing t0 may be temporally dispersed by differentiating the start timings t0 of the ejection cycles T in all the nozzle rows N1 to N4. As a result, disturbance of a waveform due to power concentration may be prevented and the number of power concentration preventing components (capacitor or the like) may be reduced.

When the waveform signal FIRE is transferred, the power load increases. According to the present embodiment, by shifting a transfer timing of the waveform signal FIRE, the above-mentioned effects (disturbance of a waveform due to power concentration may be prevented and the number of power concentration preventing components (capacitor or the like) may be reduced) may be more effectively realized.

<Modification>

Although preferred embodiments of the present invention have been described above, the present invention is not limited to the above-described embodiments, and various design modifications are possible within the scope of the claims.

In the above-described embodiment (see FIG. 2), the first nozzle row N1, the second nozzle row N2, the third nozzle row N3, and the fourth nozzle row N4 are arranged in this order in the second direction, but an arrangement order of the nozzle rows is not limited thereto. For example, the first nozzle row N1, the third nozzle row N3, the second nozzle row N2, and the fourth nozzle row N4 may be arranged in this order in the second direction.

In the above-described embodiments, in the normal mode (second mode), the nozzle row including the nozzles N having no ejection failure is selected from the two nozzle rows N1 and N3, or N2 and N4, but the present invention is not limited thereto. For example, in the two nozzle rows N1 and N3, one row of nozzles (nozzles having no ejection failure) may be selected based on whether there is an ejection failure for each row (that is, for each of two nozzles overlapping in the second direction).

The signal supplied to the drive circuit is not limited to serial data, and may be parallel data. In addition, in the above-described embodiments, the transfer circuit transfers the waveform signal and the selection signal as differential signals to the drive circuit, but the present invention is not limited thereto.

In the above-described embodiments, as a driving method of the actuator 13*x* (element), "a pushing method (a method in which the actuator 13*x* is held flat in advance, the actuator 13*x* is deformed into a convex shape toward the pressure chamber 12*p* at a predetermined timing, and the volume of the pressure chamber 12*p* is reduced to eject ink from the nozzle N)" is adopted, but the present invention is not limited thereto, and "a pulling-ejection method (a method in which the volume of the pressure chamber 12*p* is once increased and then is returned to the original volume after a predetermined time has elapsed to eject ink from the nozzle N" may be adopted. In the "pulling-ejection method", when the volume of the pressure chamber 12*p* increases, a negative pressure wave is generated in the pressure chamber 12*p*, and thereafter, at a timing when the negative pressure wave is inverted to be a positive pressure wave and the positive pressure wave is returned to the pressure chamber 12*p*, the volume of the pressure chamber 12*p* is returned to an original volume, a positive pressure wave is generated in the pressure chamber 12*p*, and the pressure waves are superimposed. By superimposing such pressure waves, a large pressure may be applied to the ink in the pressure chamber 12*p*. In the case of the "pulling-ejection method", the waveform data F0 (see FIG. 5A) maintains the potential of the individual electrode 13*c* at the driving potential (VDD). In the waveform data F1 to F3 (see FIGS. 5B to 5D), the potential of the individual electrode 13*c* is set to the driving potential (VDD) at the time point 0, and is changed between the driving potential (VDD) and the ground potential (0 V).

The element is not limited to the piezoelectric type element (actuator 13*x*) as in the above-described embodiments, and may be a thermal type element or an electrostatic type element.

The liquid ejected from the nozzle is not limited to the ink, and may be liquid other than the ink (for example, a treatment liquid that aggregates or precipitates components in the ink).

The recording medium is not limited to the sheet, and may be cloth, a resin member, or the like. In addition, the recording medium is not limited to a sheet shape, and may be a block shape or the like.

The first direction (direction in which the nozzles of each nozzle row are arranged) intersects both the second direction (scanning direction) and the orthogonal direction (conveying direction) in the above-described embodiments (see FIGS. 1 and 2), but may be orthogonal to the second direction (scanning direction) and parallel to the orthogonal direction (conveying direction).

The head is a serial type head in the above-described embodiments, but may be a line type head. In the case of the line type head, the conveying mechanism corresponds to a "moving mechanism" of the present invention. In this case, a main scanning direction corresponding to the scanning direction of FIG. 1 may be referred to as the "first direction" and the "orthogonal direction" of the present invention, and the conveying direction may be referred to as the "second direction" of the present invention.

The present invention is also applicable to a color printer including four heads that eject inks of different colors.

The present invention is not limited to be applicable to the printer, and is also applicable to a facsimile machine, a copier, a multi-function device, and the like. In addition, the present invention is also applicable to a liquid ejection device used for applications other than image recording (for example, a liquid ejection device that forms a conductive pattern by ejecting a conductive liquid onto a substrate).

The program according to the present invention may be distributed by being recorded in a removable recording medium such as a flexible disk or a fixed recording medium such as a hard disk, or may be distributed via a communication line.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A liquid ejection device, comprising:

a first nozzle row, a second nozzle row, a third nozzle row, and a fourth nozzle row each of which is a nozzle row including a plurality of nozzles arranged in a first direction;

a moving mechanism configured to move one of the plurality of nozzles and a recording medium with respect to the other of the plurality of nozzles and the recording medium in a second direction intersecting the first direction;

a plurality of elements each of which is configured to apply ejection energy for ejecting liquid from corresponding one of the plurality of nozzles;

a drive circuit configured to supply driving signals to the plurality of elements, the driving signals being based on waveform signals; and a controller, wherein the plurality of nozzles of the first nozzle row overlaps the plurality of nozzles of the third nozzle row in the second direction, wherein the plurality of nozzles of the second nozzle row do not overlap the plurality of nozzles of the first nozzle row in the second direction, and overlap the plurality of nozzles of the fourth nozzle row in the second direction, and wherein the controller is configured to supply, to the drive circuit, the waveform signals for the nozzles overlapping in the second direction in the first nozzle row and the third nozzle row and in which start timings of ejection cycles are different from each other and the ejection cycles overlap each other, so as to alternately arrange, in the second direction on the recording medium, dots of liquid ejected from the nozzles overlapping in the second direction in the first nozzle row and the third nozzle row, supply, to the drive circuit, the waveform signals for the nozzles overlapping in the second direction in the second nozzle row and the fourth nozzle row and in which start timings of ejection cycles are different from each other and the ejection cycles overlap each other, so as to alternately arrange, in the second direction on the recording medium, dots of liquid ejected from the nozzles overlapping in the second direction in the second nozzle row and the fourth nozzle row, wherein a start timing of an ejection cycle coincides with a start time of a respective waveform signal for a respective row, per ejection cycle, and alternately arrange, in a direction crossing the second direction, a set of dots of the liquid ejected from the nozzles overlapping in the second direction in the first nozzle row and the third nozzle row and a set of dots of the liquid ejected from the nozzles overlapping in the second direction in the second nozzle row and the fourth nozzle row.

2. The liquid ejection device according to claim 1, wherein the controller is configured to select a first ejection mode or a second ejection mode, and is configured to, in a case where the first ejection mode is selected, supply, to the drive circuit, the waveform signals for the nozzles overlapping in the second direction in the first nozzle row and the third nozzle row and in which the start timings of the ejection cycles are different from each other and the ejection cycles overlap each other, so as to alternately arrange, in the second direction on the recording medium, the dots of the liquid ejected from the nozzles overlapping in the second direction in the first nozzle row and the third nozzle row, supply, to the drive circuit, the waveform signals for the nozzles overlapping in the second direction in the second nozzle row and the fourth nozzle row and in which the start timings of the ejection cycles are different from each other and the ejection cycles overlap each other, so as to alternately arrange, in the second direction on the recording medium, the dots of the liquid ejected from the nozzles overlapping in the second direction in the second nozzle row and the fourth nozzle row, and alternately arrange, in the direction, the set of dots of the liquid ejected from the nozzles overlapping in the second direction in the first nozzle row and the third nozzle row and the set of dots of the liquid ejected from the nozzles overlapping in the second direction in the second nozzle row and the fourth nozzle row, and in a case where the second ejection mode is selected, supply, to the drive circuit, the waveform signals for one row of the nozzles overlapping in the second direction in the first nozzle row and the third nozzle row, so as to place dots of liquid ejected from the one row of the nozzles on the recording medium, and supply, to the drive circuit, the waveform signals for one row of the nozzles overlapping in the second direction in the second nozzle row and the fourth nozzle row, so as to place dots of liquid ejected from the one row of the nozzles on the recording medium.

3. The liquid ejection device according to claim 2, wherein the controller is configured to, in the case where the second ejection mode is selected, supply, to the drive circuit, the waveform signals for one row of nozzles having no ejection failure among the nozzles overlapping in the second direction in the first nozzle row and the third nozzle row, so as to place dots of liquid ejected from the one row of the nozzles on the recording medium, and supply, to the drive circuit, the waveform signals for one row of nozzles having no ejection failure among the nozzles overlapping in the second direction in the second nozzle row and the fourth nozzle row, so as to place dots of liquid ejected from the one row of the nozzles on the recording medium.

4. The liquid ejection device according to claim 2, wherein the ejection cycle of the waveform signal supplied to the drive circuit by the controller in the first ejection mode is the same length as the ejection cycle of the waveform signal supplied to the drive circuit by the controller in the second ejection mode.

5. The liquid ejection device according to claim 2, wherein the ejection cycle of the waveform signal supplied to the drive circuit by the controller in the first ejection mode is longer than the ejection cycle of the waveform signal supplied to the drive circuit by the controller in the second ejection mode.

6. The liquid ejection device according to claim 1, wherein the controller is configured to select a high-speed mode or a high-concentration mode, and an ejection cycle of the waveform signal supplied to the drive circuit by the controller in the high-concentration mode is longer than an ejection cycle of the waveform signal supplied to the drive circuit by the controller in the high-speed mode.

7. The liquid ejection device according to claim 1, wherein the controller is configured to set the start timing of the second nozzle row to be later than the start timing of the first nozzle row, set the start timing of the third nozzle row to be later than the start timing of the second nozzle row, and set the start timing of the fourth nozzle row to be later than the start timing of the third nozzle row.

8. The liquid ejection device according to claim 7, wherein the controller is configured to supply the waveform signals for the first nozzle row, the second nozzle row, the third nozzle row, and the fourth nozzle row to the drive circuit so as not to overlap each other.

9. A control method for controlling a liquid ejection device including: a first nozzle row, a second nozzle row, a third nozzle row, and a fourth nozzle row each of which is a nozzle row including a plurality of nozzles arranged in a first direction; a moving mechanism configured to move one of the plurality of nozzles and a recording medium with respect to the other of the plurality of nozzles and the recording medium in a second direction intersecting the first direction; a plurality of elements each of which is configured to apply ejection energy for ejecting liquid from corresponding one of the plurality of nozzles; and a drive circuit configured to supply driving signals to the plurality of elements, the driving signals being based on waveform signals, the plurality of nozzles of the first nozzle row overlapping the plurality of nozzles of the third nozzle row in the second direction, and the plurality of nozzles of the second nozzle row not overlapping the plurality of nozzles of the first nozzle row in the second direction, and overlapping the plurality of nozzles of the fourth nozzle row in the second direction, the control method comprising:

supplying, to the drive circuit, the waveform signals for the nozzles overlapping in the second direction in the first nozzle row and the third nozzle row and in which start timings of ejection cycles are different from each other and the ejection cycles overlap each other, so as to alternately arrange, in the second direction on the recording medium, dots of liquid ejected from the nozzles overlapping in the second direction in the first nozzle row and the third nozzle row;

supplying, to the drive circuit, the waveform signals for the nozzles overlapping in the second direction in the second nozzle row and the fourth nozzle row and in which start timings of ejection cycles are different from each other and the ejection cycles overlap each other, so as to alternately arrange, in the second direction on the recording medium, dots of liquid ejected from the nozzles overlapping in the second direction in the second nozzle row and the fourth nozzle row, wherein a start timing of an ejection cycle coincides with a start time of a respective waveform signal for a respective row, per ejection cycle; and alternately arranging, in a direction crossing the second direction, a set of dots of the liquid ejected from the nozzles overlapping in the second direction in the first nozzle row and the third nozzle row and a set of dots of the liquid ejected from the nozzles overlapping in the second direction in the second nozzle row and the fourth nozzle row.

10. A non-transitory computer readable medium storing a program causing a controller of a liquid ejection device to execute a process, the liquid ejection device including: a first nozzle row, a second nozzle row, a third nozzle row, and a fourth nozzle row each of which is a nozzle row including a plurality of nozzles arranged in a first direction; a moving mechanism configured to move one of the plurality of nozzles and a recording medium with respect to the other of the plurality of nozzles and the recording medium in a second direction intersecting the first direction; a plurality of elements each of which is configured to apply ejection energy for ejecting liquid from corresponding one of the plurality of nozzles; a drive circuit configured to supply driving signals to the plurality of elements; and the controller, the driving signals being based on waveform signals, the plurality of nozzles of the first nozzle row overlapping the plurality of nozzles of the third nozzle row in the second direction, and the plurality of nozzles of the second nozzle row not overlapping the plurality of nozzles of the first nozzle row in the second direction, and overlapping the plurality of nozzles of the fourth nozzle row in the second direction, wherein the process includes:

supplying, to the drive circuit, the waveform signals for the nozzles overlapping in the second direction in the first nozzle row and the third nozzle row and in which start timings of ejection cycles are different from each other and the ejection cycles overlap each other, so as to alternately arrange, in the second direction on the recording medium, dots of liquid ejected from the nozzles overlapping in the second direction in the first nozzle row and the third nozzle row;

supplying, to the drive circuit, the waveform signals for the nozzles overlapping in the second direction in the second nozzle row and the fourth nozzle row and in which start timings of ejection cycles are different from each other and the ejection cycles overlap each other, so as to alternately arrange, in the second direction on the recording medium, dots of liquid ejected from the nozzles overlapping in the second direction in the second nozzle row and the fourth nozzle row, wherein a start timing of an ejection cycle coincides with a start time of a respective waveform signal for a respective row, per ejection cycle; and alternately arranging, in a direction crossing the second direction, a set of dots of the liquid ejected from the nozzles overlapping in the second direction in the first nozzle row and the third nozzle row and a set of dots of the liquid ejected from the nozzles overlapping in the second direction in the second nozzle row and the fourth nozzle row.

* * * * *